United States Patent
Brensinger et al.

(10) Patent No.: US 10,455,924 B2
(45) Date of Patent: Oct. 29, 2019

(54) SLEEPING PAD FOR SLEEPING COT

(71) Applicant: Nemo Equipment, Inc., Dover, NH (US)

(72) Inventors: Camon Brensinger, Stratham, NH (US); Kurtis Schnackenberg, Dover, NH (US)

(73) Assignee: NEMO EQUIPMENT, INC., Dover, NH (US)

( * ) Notice: Subject to any disclaimer, the term of this patent is extended or adjusted under 35 U.S.C. 154(b) by 194 days.

(21) Appl. No.: 15/223,286

(22) Filed: Jul. 29, 2016

(65) Prior Publication Data
US 2017/0027334 A1    Feb. 2, 2017

Related U.S. Application Data

(60) Provisional application No. 62/199,481, filed on Jul. 31, 2015.

(51) Int. Cl.
| | |
|---|---|
| *A47C 27/08* | (2006.01) |
| *A45F 3/22* | (2006.01) |
| *B29D 22/02* | (2006.01) |
| *A47C 27/14* | (2006.01) |
| *B29C 65/02* | (2006.01) |
| *A47G 9/08* | (2006.01) |
| *B29K 75/00* | (2006.01) |
| *B29L 31/00* | (2006.01) |

(52) U.S. Cl.
CPC .............. *A45F 3/22* (2013.01); *A47C 27/081* (2013.01); *A47C 27/084* (2013.01); *A47C 27/146* (2013.01); *A47G 9/086* (2013.01); *B29C 65/02* (2013.01); *B29D 22/02* (2013.01); *B29K 2075/00* (2013.01); *B29L 2031/751* (2013.01)

(58) Field of Classification Search
CPC ..................................................... A47C 27/08
USPC .................................... 5/706, 708, 120, 122
See application file for complete search history.

(56) References Cited

U.S. PATENT DOCUMENTS

| | | | | |
|---|---|---|---|---|
| 3,045,257 A | * | 7/1962 | Knapp | A47C 17/70 5/111 |
| 5,632,055 A | * | 5/1997 | Graf | A47C 27/081 5/706 |
| 6,948,206 B1 | * | 9/2005 | Valencia | A47C 27/081 5/120 |

* cited by examiner

Primary Examiner — Fredrick C Conley

(57) ABSTRACT

A contoured sleeping pad for use on a hot or other similar structure having a sag or "valley" in a central region. The contoured sleeping pad includes top and bottom surfaces and left and right longitudinal edges. The contoured sleeping pad has a height or thickness proximate the left and right longitudinal edges which is less than the height in a central region approximately midway between the left and right longitudinal edges.

9 Claims, 4 Drawing Sheets

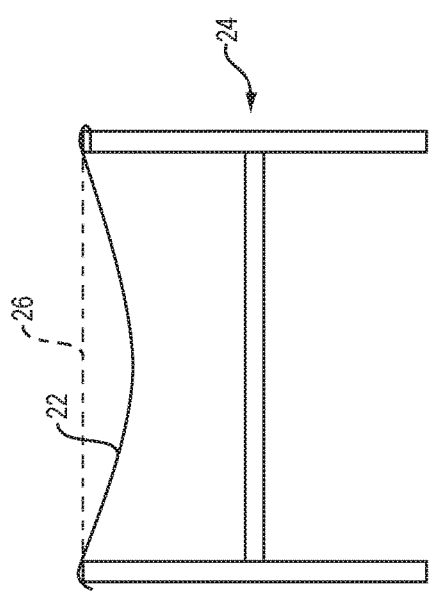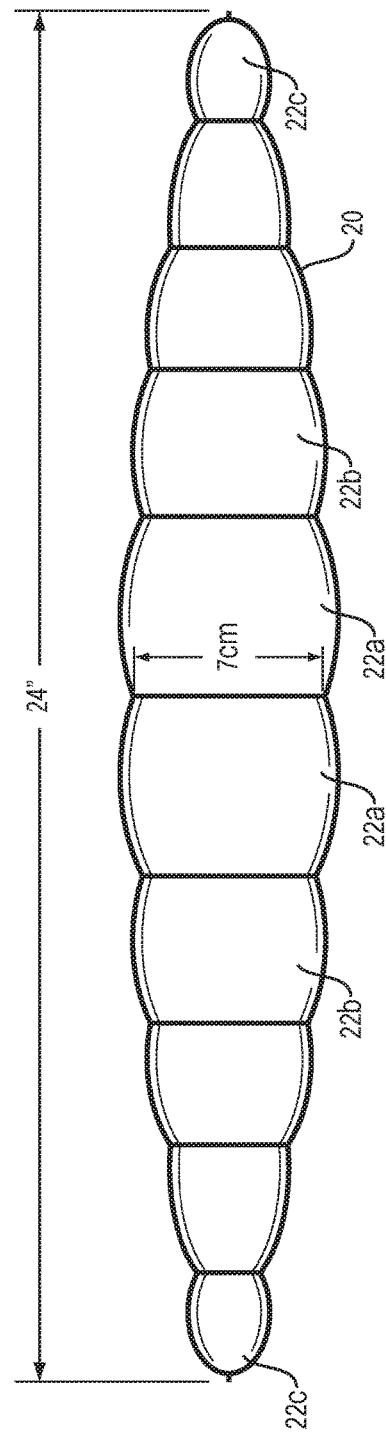
FIG. 1
FIG. 2

SLEEPING PAD FOR SLEEPING COT

CROSS-REFERENCE TO RELATED APPLICATIONS

This application claims priority from U.S. Provisional Patent Application No. 62/199,481, titled "OUTDOOR EQUIPMENT 2015", which was filed on Jul. 31, 2015 and is incorporated fully herein by reference.

TECHNICAL FIELD

The present invention relates to outdoor equipment and more particularly, relates to an inflatable sleeping pad designed to fit the contour of a foldable cot.

BACKGROUND INFORMATION

Many camps and remote hike-in cabins provide cots on which a user may sleep. Cots provide a much more comfortable sleeping surface than simply putting a sleeping bag on the ground. Although cots attempt to provide a stiff, non-deformable sleeping surface, most cots are made of fabric and either initially, or over time, they "sag" providing an uncomfortable sleeping surface having a "valley" in the center region as shown by line 22 in FIG. 1. Accordingly, what is needed is a sleeping pad for use with a cot which accounts for the contour or sag in the sleeping surface of the cot and provides a generally flat sleeping surface for the user.

SUMMARY OF THE INVENTION

The invention features, in a first embodiment, a contoured sleeping pad having a length, a width and a top and bottom surface, the width defined by first and second longitudinal edges, wherein the top and bottom surfaces are joined proximate the first and second longitudinal edges and define a cavity between the top and bottom surfaces.

The sleeping bag has a first thickness proximate the first and second longitudinal edges and a second thickness proximate a central region of the width at a point approximately one-half of the distance between the first and second longitudinal edges, and wherein the second thickness is greater than the first thickness.

In another embodiment, the cavity of the contoured sleeping pad is filled with air while in another embodiment, the cavity is filled with a foam material such as an open cell foam. In a further embodiment, the sleeping pad includes an integral pillow and may also include an integral air pump, configured for filling the cavity with air. The contoured sleeping pad may further include an air inlet/outlet, disposed in one of the top and bottom surfaces and fluidly coupled to the cavity, and configured for allowing air to enter and exit the cavity.

In another embodiment, the contoured sleeping pad has a length, a width and a top and bottom surface, the width defined by first and second longitudinal edges, and wherein the top and bottom surfaces are joined proximate the first and second longitudinal edges and define a cavity between the top and bottom surfaces, wherein the cavity is filled with air.

The sleeping pad has a first thickness proximate the first and second longitudinal edges and a second thickness proximate a central region of the width at a point approximately one-half of a distance between the first and second longitudinal edges, the second thickness being greater than the first thickness. In this embodiment, the sleeping pad further includes an integral air pump, configured for filling the cavity with the air.

The invention features, in yet another embodiment, a contoured sleeping pad having a length, a width and a top and bottom surface, the width defined by first and second longitudinal edges. The top and bottom surfaces are joined proximate the first and second longitudinal edges and define a cavity between the top and bottom surfaces.

In this embodiment, the cavity is filled with an open cell foam material and an air inlet/outlet is disposed in one of the top and bottom surfaces and fluidly coupled to the cavity, and configured for allowing air to enter and exit the cavity. The sleeping pad has a first thickness proximate the first and second longitudinal edges and a second thickness proximate a central region of the width at a point approximately one-half of a distance between the first and second longitudinal edges, the second thickness being greater than the first thickness.

BRIEF DESCRIPTION OF THE DRAWINGS

These and other features and advantages of the present invention will be better understood by reading the following detailed description, taken together with the drawings wherein:

FIG. 1 is a cross-sectional view of a sleeping cot illustrating the sag in the sleeping surface of the cot as well as showing the surface provided by the sleeping pad of the present invention;

FIG. 2 is a cross-sectional view of an inflatable sleeping pad for a sleeping cot which accounts for the curvature or deformation in the central region of the sleeping surface of the cot in accordance with the teachings of the present invention;

DETAILED DESCRIPTION OF THE PREFERRED EMBODIMENTS

Figure 3:
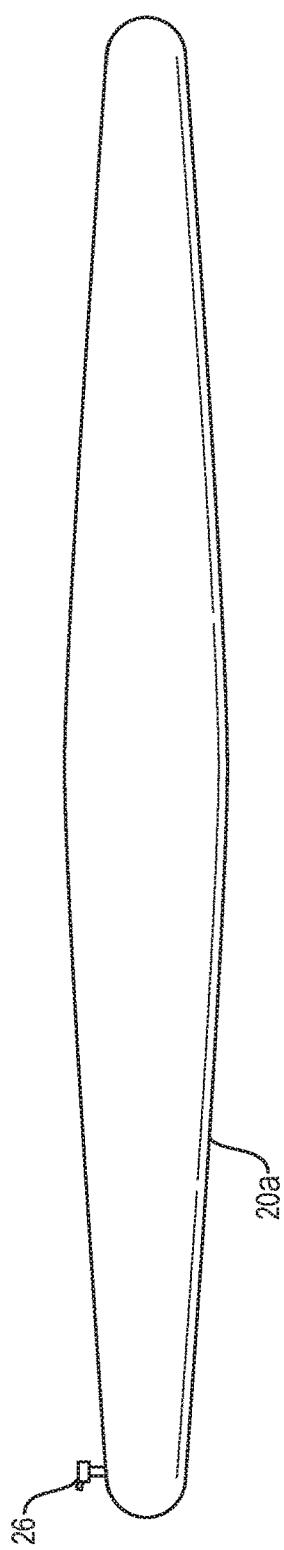
FIG. 3 is a cross-sectional view of a sleeping pad for a sleeping cot made from an open or closed cell foam without large individual air containing cells.
Figure 4:
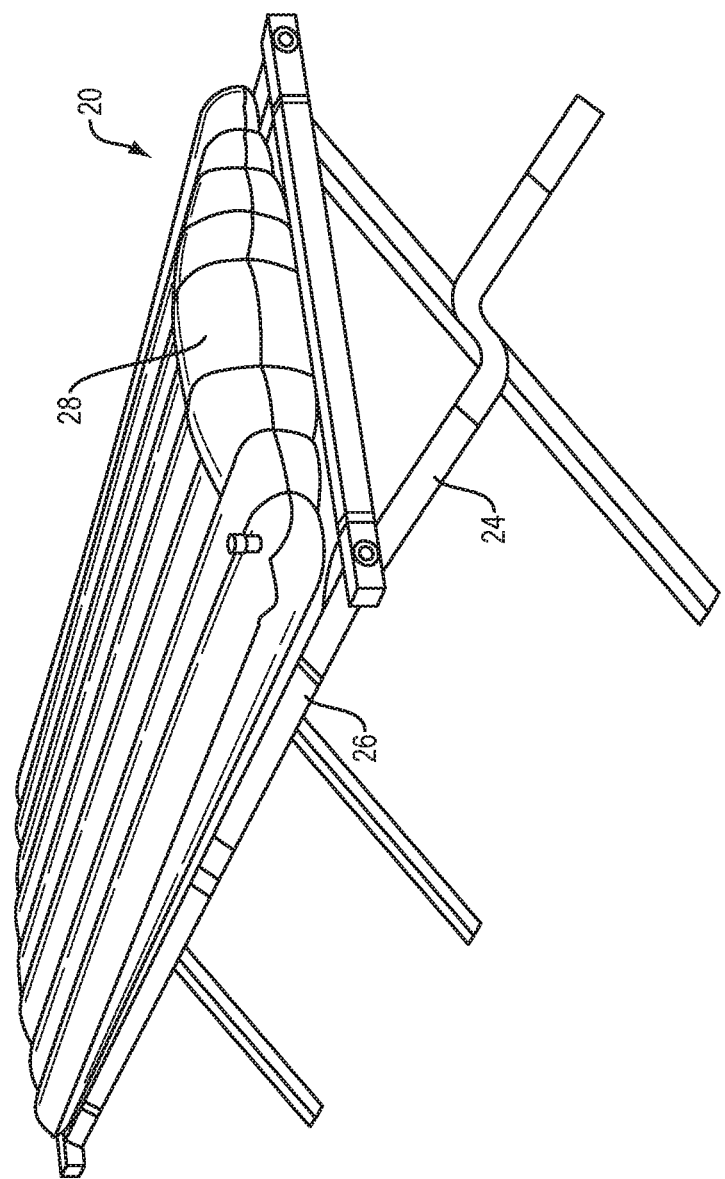
FIG. 4 is a plan view of an inflatable sleeping pad according to the present invention having a contoured cross section which accounts for the curvature or D formation in the central region of the sleeping surface of the cot and further includes an integral pillow and inflation valve.

The present invention features a sleeping pad 20, FIG. 2, contoured to fit the arcuate top surface 22, FIG. 1 of a sleeping cot 24. By placing the sleeping pad 20 on the top or sleeping surface 22 of the cot 24 creates a generally level sleeping surface 26 for the user. The sleeping pad 20 is contoured or shaped for use with a sleeping cot according to the present invention may be made out of foam encapsulated in a thin fabric material or alternatively, may be an air-filled inflatable or blow up pad which is inflated by the user before use.

As shown in one embodiment in FIG. 2, the sleeping pad 20 is an air-filled blow up pad comprising a number of air containing cells 23. By making the center cells 23a taller or higher (approximately inches high) than the end most cells 23c (approximately inches high), the sleeping pad 20 fits the contour 22 of the sleeping cot with a user laying on the cot 24 presenting a generally flat surface 26 for the user to sleep on. An inflatable or blow up pad 20 provides the added benefit of allowing the user to roll up and store the pad 20 in a small pack or sack encouraging use of the pad 20 in backpacking and/or hiking situations.

In another embodiment, the sleeping pad 20a, FIG. 3, may be made from open or closed cell foam which does not need to be inflated or may be self-inflating and having an inflation/deflation valve 26 allowing a user to allow air to enter the foam core to inflate the pad while allowing the air to exit the pad, allowing the pad to deflate when a user wants to roll up and store the pad. A self-inflating sleeping pad provides a reliable sleeping pad and may be made from a high density, solid open-cell foam core wrapped in a durable polyester material having an internal polyurethane coating.

Figure 5:
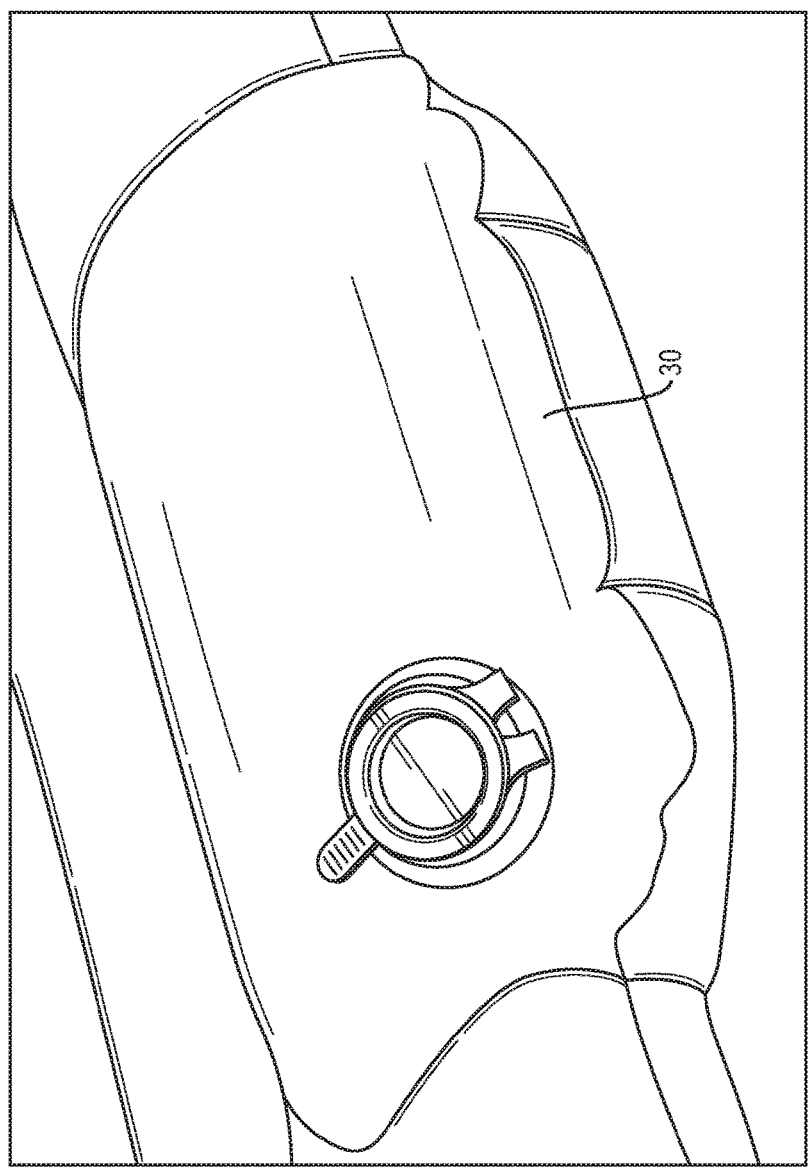
FIG. 5 is a schematic representation of an integral foot pump in accordance with one feature of the present invention.

Both embodiments may feature an integrated and/or external foot pump which is used to inflate the inflatable sleeping pad of the first embodiment or to add more air to the self-inflating pad embodiment. Air pumps used for sleeping pads and inflatable beds are well-known in the art, while an integral foot pump is also known in the art and is shown at 30, FIG. 5. An integral pillow 28 may also be included in both embodiments.

Accordingly, the present invention provides a novel shaped or contoured sleeping pad which conforms to the contour of a cot to provide a generally flat sleeping surface without the normal valley associated with a folding cot.

Modifications and substitutions by one of ordinary skill in the art are considered to be within the scope of the present invention, which is not to be limited except by the allowed claims and their legal equivalents.

What is claimed is:

1. A flexible contoured sleeping pad comprised of a plurality of inflatable cells, said flexible contoured sleeping pad configured for being disposed upon a support surface having a sag when measured from first and second outer side edges of said support surface towards a central region of said support surface, for creating a generally level sleeping surface on said support surface having a sag, comprising:
    the flexible contoured sleeping pad having a length, a width and a top and bottom surface, said width defined by first and second longitudinal edges, wherein said top and bottom surfaces are joined proximate said first and second longitudinal edges in defining a plurality of sleeping pad inflatable cells disposed between said top and bottom surfaces; and
    said flexible contoured sleeping pad comprising a plurality of sleeping pad inflatable cells including one or more inflatable cells proximate a central portion of said width of said flexible contoured sleeping pad and first and second inflatable cells disposed proximate said first and second longitudinal edges respectively, said first and second inflatable cells disposed proximate said first and second longitudinal edges having a first thickness proximate said first and second longitudinal edges and said one or more inflatable cells proximate a central portion of said width of said flexible contoured sleeping pad having a second thickness proximate a central region of said width at a point approximately one-half of a distance between said first and second longitudinal edges, said second thickness being greater than said first thickness, wherein a thickness of said flexible contoured sleeping pad increases from said first thickness proximate said first and second longitudinal edges to said second thickness proximate a central region in gradual thickness increments in successive and adjoining inflatable cells which increments correspond generally to said sag in said support surface, such that said flexible contoured sleeping pad is configured for creating a generally level sleeping surface on said support surface having a sag when measured from said first and second outer side edges of said support surface towards said central region of said support surface.

2. The flexible contoured sleeping pad according to claim 1, wherein said plurality of inflatable cells are filled with air.

3. The flexible contoured sleeping pad according to claim 2, further including an integral air pump, configured for filling said plurality of inflatable cells with air.

4. The flexible contoured sleeping pad according to claim 1, further including an integral pillow proximate one end of said flexible contoured sleeping pad.

5. The flexible contoured sleeping pad according to claim 1, wherein said plurality of inflatable cells are filled with a foam material.

6. The flexible contoured sleeping pad according to claim 5, wherein said foam material is an open cell foam.

7. The flexible contoured sleeping pad according to claim 6, further including at least one air inlet/outlet, disposed in one or more of said plurality of inflatable cells and fluidly coupled to said plurality of inflatable cells, and configured for allowing air to enter and exit said plurality of inflatable cells.

8. A flexible contoured sleeping pad comprised of a plurality of inflatable cells, said flexible contoured sleeping pad configured for being disposed upon a support surface having a sag when measured from first and second outer side edges of said support surface towards a central region of said support surface, for creating a generally level sleeping surface on said support surface having a sag, comprising:
    the flexible contoured sleeping pad having a length, a width and a top and bottom surface, said width defined by first and second longitudinal edges, wherein said top and bottom surfaces are joined proximate said first and second longitudinal edges in defining a plurality of sleeping pad inflatable cells disposed between said top and bottom surfaces, wherein plurality of inflatable cells are filled with air;
    said flexible contoured sleeping pad comprising a plurality of sleeping pad inflatable cells including one or more inflatable cells proximate a central portion of said width of said flexible contoured sleeping pad and first and second inflatable cells disposed proximate said first and second longitudinal edges respectively, said first and second inflatable cells disposed proximate said first and second longitudinal edges having a first thickness proximate said first and second longitudinal edges and said one or more inflatable cells proximate a central portion of said width of said flexible contoured sleeping pad having a second thickness proximate a central region of said width at a point approximately one-half of a distance between said first and second longitudinal edges, said second thickness being greater than said first thickness, wherein a thickness of said flexible contoured sleeping pad increases from said first thickness proximate said first and second longitudinal edges to said second thickness proximate a central region in gradual thickness increments in successive and adjoining inflatable cells which increments correspond generally to said sag in said support surface, such that said flexible contoured sleeping pad is configured for creating a generally level sleeping surface on said support surface having a sag when measured from said first and second outer side edges of said support surface towards said central region of said support surface; and said sleeping pad further including an integral air pump, coupled to one or more of said plurality of inflatable cells and configured for filling said plurality of inflatable cells with said air.

9. A flexible contoured sleeping pad comprised of a plurality of inflatable cells, said flexible contoured sleeping pad configured for being disposed upon a support surface having a sag when measured from first and second outer side edges of said support surface towards a central region of said support surface, for creating a generally level sleeping surface on said support surface having a sag, comprising:
- the flexible contoured sleeping pad having a length, a width and a top and bottom surface, said width defined by first and second longitudinal edges, wherein said top and bottom surfaces are joined proximate said first and second longitudinal edges in defining a plurality of sleeping pad inflatable cells disposed between said top and bottom surfaces, wherein said cavity is filled with an open cell foam material;
- an air inlet/outlet, disposed in one of said top and bottom surfaces and fluidly coupled to plurality of inflatable cells, and configured for allowing air to enter and exit said plurality of inflatable cells; and
- said flexible contoured sleeping pad comprising said plurality of sleeping pad inflatable cells including one or more inflatable cells proximate a central portion of said width of said flexible contoured sleeping pad and first and second inflatable cells disposed proximate said first and second longitudinal edges respectively, said first and second inflatable cells disposed proximate said first and second longitudinal edges having a first thickness proximate said first and second longitudinal edges and said one or more inflatable cells proximate a central portion of said width of said flexible contoured sleeping pad having a second thickness proximate a central region of said width at a point approximately one-half of a distance between said first and second longitudinal edges, said second thickness being greater than said first thickness, wherein a thickness of said flexible contoured sleeping pad increases from said first thickness proximate said first and second longitudinal edges to said second thickness proximate a central region in gradual thickness increments in successive and adjoining inflatable cells which increments correspond generally to said sag in said support surface, such that said flexible contoured sleeping pad is configured for creating a generally level sleeping surface on said support surface having a sag when measured from said first and second outer side edges of said support surface towards said central region of said support surface.

* * * * *